United States Patent
Yoo et al.

(10) Patent No.: US 10,553,863 B2
(45) Date of Patent: Feb. 4, 2020

(54) NEGATIVE ACTIVE MATERIAL FOR LITHIUM SECONDARY BATTERY AND LITHIUM SECONDARY BATTERY INCLUDING THE SAME

(71) Applicant: Samsung SDI Co., Ltd., Yongin-si, Gyeonggi-do (KR)

(72) Inventors: Hana Yoo, Yongin-si (KR); Seunguk Kwon, Yongin-si (KR); Jaehyuk Kim, Yongin-si (KR); Soonsung Suh, Yongin-si (KR); Dukhyoung Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 113 days.

(21) Appl. No.: 15/870,731

(22) Filed: Jan. 12, 2018

(65) Prior Publication Data

US 2018/0261837 A1    Sep. 13, 2018

(30) Foreign Application Priority Data

Mar. 10, 2017    (KR) .......................... 10-2017-0030542

(51) Int. Cl.
*H01M 4/38*    (2006.01)
*H01M 4/134*    (2010.01)
(Continued)

(52) U.S. Cl.
CPC ................. *H01M 4/38* (2013.01); *C08K 3/08* (2013.01); *H01M 4/134* (2013.01); *H01M 4/364* (2013.01);
(Continued)

(58) Field of Classification Search
CPC ...... H01M 4/38; H01M 10/052; H01M 4/364; H01M 4/134; H01M 2004/027; C08K 3/08
See application file for complete search history.

(56) References Cited

U.S. PATENT DOCUMENTS 7,955,735 B2    6/2011    Bito et al.
9,306,216 B2    4/2016    Moon et al.
(Continued)

FOREIGN PATENT DOCUMENTS

KR    10-2005-0090220    9/2005
KR    10-0790271    1/2008
(Continued)

OTHER PUBLICATIONS

Chil-Hoon Doh, et al, "Effect of Silicon Content over Fe—Cu—Si/C Based Composite Anode for Lithium Ion Battery", Bull. Korean Chem. Soc. 2008, pp. 309-312, vol. 29, No. 2.

*Primary Examiner* — Stewart A Fraser
(74) *Attorney, Agent, or Firm* — Lewis Roca Rothgerber Christie LLP

(57) ABSTRACT

A negative active material for a lithium secondary battery and a lithium secondary battery including the same are provided. The negative active material may be a silicon (Si)-based alloy negative active material. In some embodiments, the Si-based alloy negative active material may include Si, iron (Fe), copper (Cu), and aluminum (Al), and may have a Si single phase and a first alloy phase, the first alloy phase being represented by a formula of $Al_xCu_y$, where x<y. In some embodiments, the Si-based alloy negative active material may include Si, Fe, and Cu, and may include a Si single phase, a first alloy phase, and a second alloy phase, the first alloy phase being represented by a formula of $Cu_{15}Si_4$, and the second alloy phase being represented by a formula of $Cu_3Fe_{17}$.

11 Claims, 5 Drawing Sheets

(51) Int. Cl.
    *H01M 4/36*     (2006.01)
    *H01M 10/052*     (2010.01)
    *C08K 3/08*     (2006.01)

(52) U.S. Cl.
    CPC ..... *H01M 10/052* (2013.01); *C08K 2003/085* (2013.01); *C08K 2003/0812* (2013.01); *C08K 2003/0856* (2013.01)

(56) References Cited

U.S. PATENT DOCUMENTS

| | | | |
|---|---|---|---|
| 2014/0332716 A1* | 11/2014 | Hong | H01M 4/386 252/182.1 |
| 2014/0370386 A1 | 12/2014 | Hirono et al. | |
| 2016/0315318 A1* | 10/2016 | Park | H01M 4/386 |
| 2016/0372745 A1 | 12/2016 | Choi et al. | |

FOREIGN PATENT DOCUMENTS

| | | |
|---|---|---|
| KR | 10-2013-0089569 | 8/2013 |
| KR | 10-2014-0039329 | 4/2014 |
| KR | 10-2015-0096241 | 8/2015 |

\* cited by examiner

NEGATIVE ACTIVE MATERIAL FOR LITHIUM SECONDARY BATTERY AND LITHIUM SECONDARY BATTERY INCLUDING THE SAME

CROSS-REFERENCE TO RELATED APPLICATION

This application claims priority to and the benefit of Korean Patent Application No. 10-2017-0030542, filed on Mar. 10, 2017, in the Korean Intellectual Property Office, the entire content of which is incorporated herein by reference.

BACKGROUND

1. Field

Aspects of example embodiments of the present disclosure relate to a negative active material for a lithium secondary battery and a lithium secondary battery including the same.

2. Description of the Related Art

Lithium secondary batteries convert chemical energy into electrical energy via oxidation and reduction reactions associated with the positive and negative electrodes. Typically, an electrolyte is included between positive and negative electrodes, which each include active materials capable of intercalating and deintercalating lithium ions.

Examples of suitable negative active materials for lithium secondary batteries include metallic materials such as silicon (Si), tin (Sn), and the like, which are capable of intercalating and deintercalating lithium by alloying with lithium. When a metallic material is used alone as a negative active material, repetitive expansion and contraction of the material may occur during intercalation and deintercalation of lithium ions. Furthermore, the volumetric change during the expansion and contraction may be very large during charging and discharging of a battery. As a result, the metallic material may detach from the negative electrode, resulting in very poor cycle characteristics.

Therefore, there is a need to develop a negative active material that may compensate for these problems and a lithium secondary battery including the same.

SUMMARY

One or more embodiments of the present disclosure provide a negative active material having enhanced charge and discharge characteristics such as initial efficiency, capacity, and lifespan.

One or more embodiments of the present disclosure provide a lithium secondary battery including the above-described negative active material.

Additional aspects will be set forth in part in the description which follows and, in part, will be apparent from the description, or may be learned by practice of the presented embodiments.

According to one or more embodiments of the present disclosure, a negative active material for a lithium secondary battery includes a silicon (Si)-based alloy negative active material including Si, iron (Fe), copper (Cu), and aluminum (Al), wherein the Si-based alloy negative active material includes a Si single phase and a first alloy phase, the first alloy phase being represented by a formula of $Al_xCu_y$, where $x<y$.

According to one or more embodiments of the present disclosure, a negative active material for a lithium secondary battery includes a Si-based alloy negative active material including Si, Fe, and Cu, wherein the Si-based alloy negative active material includes a Si single phase, a first alloy phase, and a second alloy phase, the first alloy phase being represented by a formula of $Cu_{15}Si_4$, and the second alloy phase being represented by a formula of $Cu_3Fe_{17}$.

According to one or more embodiments of the present disclosure, a lithium secondary battery includes a negative electrode including the above-described negative active material, a positive electrode, and an electrolyte between the negative electrode and the positive electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
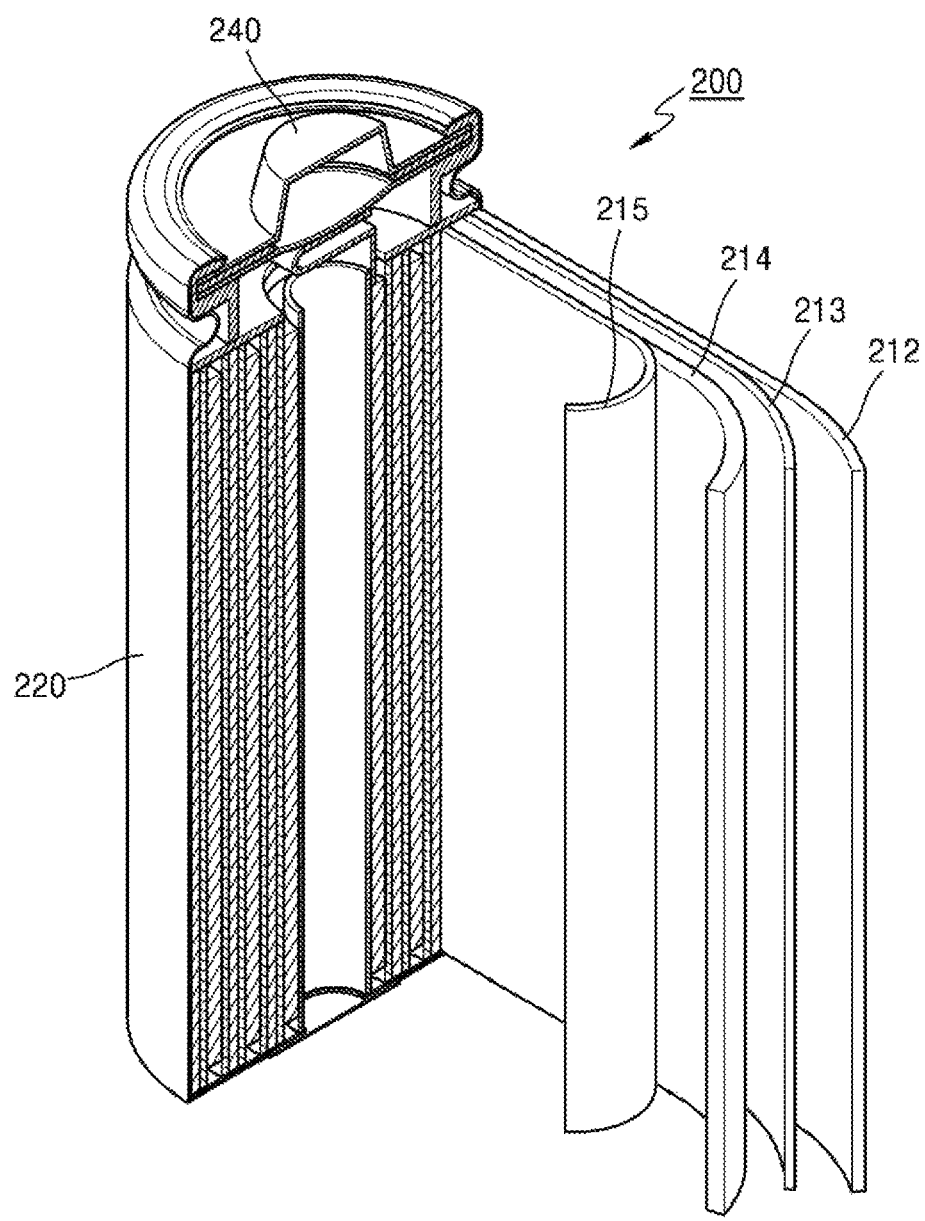
FIG. 1 is a schematic view illustrating a structure of a lithium secondary battery according to an embodiment of the present disclosure.

Reference will now be made in more detail to embodiments, examples of which are illustrated in the accompanying drawings, wherein like reference numerals refer to like elements throughout and duplicative descriptions thereof may not be provided. In this regard, the present embodiments may have different forms and should not be construed as being limited to the descriptions set forth herein. Accordingly, the embodiments are merely described below, by referring to the drawings, to explain aspects of the present description. As used herein, the term "and/or" includes any and all combinations of one or more of the associated listed items. Expressions such as "at least one of", "one of", at least one selected from", and "one selected from", when preceding a list of elements, modify the entire list of elements and do not modify the individual elements of the list.

The thicknesses of layers, films, panels, regions, etc., may be exaggerated in the drawings for clarity. It will be understood that when an element such as a layer, film, region, or substrate is referred to as being "on" another element, it can be directly on the other element or intervening element(s)

may also be present. In contrast, when an element is referred to as being "directly on" another element, no intervening elements are present.

Hereinafter, a negative active material for a lithium secondary battery, according to an embodiment of the present disclosure, and a lithium secondary battery including the same will be described in more detail with reference to the accompanying drawings. Embodiments described below are provided only for illustrative purposes and are not intended to limit the scope of the invention.

The term "silicon (Si)-based negative active material" as used herein indicates a material including at least about 5% silicon. For example, the Si-based negative active material may include at least about 10%, at least about 20%, at least about 30%, at least about 40%, or at least about 50% silicon.

The terms "including" and "comprising" as used herein do not preclude the presence of other elements, and indicate possible addition and/or intervention of other elements, unless otherwise specified herein.

When such a Si-based negative active material is used alone, one silicon atom may react with a maximum of 4.4 lithium atoms. During charging and discharging of a lithium secondary battery including the Si-based negative active material, the negative active material may undergo volumetric expansion up to a maximum of 400%. Thus, the capacity and lifespan characteristics of a lithium secondary battery including the same may rapidly deteriorate.

To address these problems, research has been conducted on negative active materials including an alloy of Si and another metal, e.g., a Si-M alloy where M is a metal element. Such an alloy-type negative active material is known to be composed of a Si single phase capable of combining with lithium, a metal silicide ($M_xSi_y$, where x and y are natural numbers) that does not combine with lithium, and the like. In this regard, the Si single phase is capable of combining with lithium and releasing lithium during charging and discharging of a battery, respectively, and is the source of the battery's capacity. The metal silicide phase does not combine with lithium and suppresses a volumetric change of the single phase component (e.g., the Si single phase and/or the like), thereby suppressing the volumetric expansion of the negative active material.

Even when a negative active material is formed of a Si single phase and a metal silicide ($M_xSi_y$, where x and y are natural numbers) that does not combine with lithium, satisfactory capacity and cycle characteristics are not obtained.

A negative active material for a lithium secondary battery, according to embodiments of the present disclosure, may be a silicon (Si)-based alloy negative active material including Si; iron (Fe), copper (Cu), and aluminum (Al). The Si-based alloy negative active material may have a Si single phase and a first alloy phase, the first alloy phase being represented by a formula of $Al_xCu_y$, where x<y.

The negative active material for a lithium secondary battery may be a Si-based alloy negative active material including Si, Fe, Cu, and Al. The Si-based alloy negative active material may have a form in which a Si-based alloy negative active material formed of Si and Fe is doped with Cu and Al. The Si-based alloy negative active material may have a Si single phase capable of contributing to battery capacity according to an electrochemical reaction of a battery, and a first alloy phase represented by the formula of $Al_xCu_y$, where x<y. The first alloy phase may include $Al_4Cu_9$. For example, $Al_xCu_y$ may be $Al_4Cu_9$.

When the Si-based alloy negative active material includes an $Al_4Cu_9$ phase, a large amount of Si active particles with respect to the amount of Si may be formed even when the same amount of Si is added. Accordingly, the Si active particles may be fine (e.g., small) in size. Consequently, a lithium secondary battery including the Si-based alloy negative active material may have enhanced charge and discharge characteristics such as initial efficiency, capacity (capacity per weight and capacity per volume), and lifespan characteristics.

The Si-based alloy negative active material may further have a second alloy phase that may be composed of Si and Fe or Si and Cu. In some embodiments, the second alloy phase may include at least one alloy phase represented by a formula selected from $Cu_{15}Si_4$ and $Fe_2Si_5$.

Since the Si-based alloy negative active material has at least one alloy phase selected from $Cu_{15}Si_4$ and $Fe_2Si_5$, the amount of Si used may be decreased, and the capacity (e.g., discharge capacity) and electrical conductivity of a negative electrode including the Si-based alloy negative active material may be enhanced. The Si-based alloy negative active material may exhibit increased volumetric capacity (capacity per volume) due to the corresponding increase in density.

The amount of Fe may range from about 5 atom % to about 20 atom % based on 100 atom % of the Si-based alloy negative active material. For example, the amount of Fe may range from about 6 atom % to about 17 atom % based on 100 atom % of the Si-based alloy negative active material.

The amount of Cu may range from about 3 atom % to about 15 atom % based on 100 atom % of the Si-based alloy negative active material. For example, the amount of Cu may range from about 4 atom % to about 8 atom % based on 100 atom % of the Si-based alloy negative active material. For example, the amount of Cu may range from about 4 atom % to about 8 atom % based on 100 atom % of the Si-based alloy negative active material.

The amount of Al may range from about 2 atom % to about 5 atom % based on 100 atom % of the Si-based alloy negative active material. For example, the amount of Al may range from about 2 atom % to about 4 atom % based on 100 atom % of the Si-based alloy negative active material.

When the amounts of Cu and Al in the Si-based alloy negative active material are within the above-described ranges, Cu and Al may be doped in appropriate or suitable amounts due to excellent reactivity, and thus the Si single phase and the first alloy phase represented by a formula of $Al_xCu_y$, where x<y, and/or an alloy phase composed of Si and Fe or Si and Cu may be formed. Accordingly, the electrical conductivity of the negative electrode, adhesion between the negative electrode plate and the negative active material, and charge and discharge characteristics (such as initial efficiency, capacity (capacity per weight and capacity per volume), and lifespan characteristics) may be enhanced in a lithium secondary battery including the Si-based alloy negative active material.

The amount of Si may range from about 60 atom % to about 90 atom % based on 100 atom % of the Si-based alloy negative active material. For example, the amount of Si may range from about 70 atom % to about 90 atom % based on 100 atom % of the Si-based alloy negative active material. For example, the amount of Si may range from about 75 atom % to about 90 atom % based on 100 atom % of the Si-based alloy negative active material.

The Si-based alloy negative active material may have a capacity per volume of about 900 mAh/cc or more. For example, the capacity per volume of the Si-based alloy negative active material may be about 910 mAh/cc or more. For example, the capacity per volume of the Si-based alloy negative active material may be about 915 mAh/cc or more.

The Si single phase may include Si active particles, and the Si active particles may have an average particle size of about 45 nm to about 60 mm. The negative active material including the Si active particles may have enhanced efficiency and lifespan characteristics. The average particle size of the Si active particles may be obtained by measuring the full width at half maximum (FWHM) value of an XRD peak corresponding to the Si single phase and calculating the average particle size using the Scherrer equation.

The negative active material for a lithium secondary battery, according to embodiments of the present disclosure, may be a Si-based alloy negative active material including Si, Fe, and Cu, and the Si-based alloy negative active material may include a Si single phase, a first alloy phase, and a second alloy phase. The first alloy phase may be represented by a formula of $Cu_{15}Si_4$, and a second alloy phase may be represented by a formula of $Cu_3Fe_{17}$.

When the Si-based alloy negative active material includes the Si single phase, the first alloy phase represented by a formula of $Cu_{15}Si_4$, and the second alloy phase represented by a formula of $Cu_3Fe_{17}$, the amounts of Si and Fe used may be decreased and capacity thereof may be increased. Accordingly, the Si-based alloy negative active material may have enhanced electrical conductivity in a matrix phase and volumetric capacity (capacity per volume).

The Si-based alloy negative active material may further have a third alloy phase, and the third alloy phase may include at least one alloy phase represented by a formula selected from $Fe_2Si_5$ and FeSi.

The amount of Fe may range from about 6 atom % to about 17 atom % based on 100 atom % of the Si-based alloy negative active material.

The amount of Cu may range from about 4 atom % to about 8 atom % based on 100 atom % of the Si-based alloy negative active material.

When the amount of Cu in the Si-based alloy negative active material is within the above-described range, Cu may be doped in an appropriate or suitable amount due to excellent reactivity, and thus the Si single phase, the first alloy phase represented by a formula $Cu_{15}Si_4$, and the second alloy phase represented by a formula $Cu_3Fe_{17}$, and/or a third alloy phase composed of at least one represented by a formula selected from $Fe_2Si_5$ and FeSi may be formed. Accordingly, the electrical conductivity of the negative electrode, adhesion between a negative electrode plate and the negative active material, and charge and discharge characteristics such as initial efficiency, capacity (capacity per weight and capacity per volume), and lifespan characteristics may be enhanced in a lithium secondary battery which includes the Si-based alloy negative active material.

The amount of Si may range from about 60 atom % to about 90 atom % based on 100 atom % of the Si-based alloy negative active material. For example, the amount of Si may range from about 70 atom % to about 90 atom % based on 100 atom % of the Si-based alloy negative active material. For example, the amount of Si may range from about 75 atom % to about 90 atom % based on 100 atom % of the Si-based alloy negative active material.

A lithium secondary battery according to another embodiment of the present disclosure may include: a negative electrode including the above-described negative active material; a positive electrode; and an electrolyte between the negative electrode and the positive electrode.

First, the negative electrode may be manufactured as follows.

A negative electrode slurry composition is prepared by mixing a negative active material, a conductive material, a binder, and a solvent. The negative electrode slurry composition may be directly coated onto a negative current collector and dried, thereby completing the manufacture of a negative electrode including a negative active material layer. In another embodiment, the negative electrode slurry composition may be cast onto a separate support, and then a film separated from the support may be laminated on a negative current collector, thereby completing the manufacture of a negative electrode including a negative active material layer.

As the negative active material, negative active materials including the above-described Si-based alloy negative active material may be used.

In addition, the negative active material may include, in addition to the above-described negative active material, any negative active material that may be used as a negative active material of a lithium secondary battery in the art. For example, the negative active material may include at least one selected from lithium metal, a metal alloyable with lithium, a transition metal oxide, a non-transition metal oxide, and a carbonaceous material.

For example, the metal alloyable with lithium may be silicon (Si), tin (Sn), aluminum (Al), germanium (Ge), lead (Pb), bismuth (Bi), antimony (Sb), a Si—Y' alloy (where Y' is an alkali metal, an alkali earth metal, a Group 13 and 14 element except for Si, a transition metal, a rare earth element, or a combination thereof), a Sn—Y' alloy (where Y' is an alkali metal, an alkali earth metal, a Group 13 and 14 element except for Sn, a transition metal, a rare earth element, or a combination thereof), and/or the like. Non-limiting examples of Y' may include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), and combinations thereof.

For example, the transition metal oxide may include lithium titanate oxide, vanadium oxide, lithium vanadium oxide, and/or the like.

For example, the non-transition metal oxide may include $SnO_2$, $SiO_x$ where $0<x<2$, and/or the like.

The carbonaceous material may include crystalline carbon, amorphous carbon, or a mixture thereof. Non-limiting examples of the crystalline carbon may include natural graphite and artificial graphite, each of which may be a shapeless type or a plate, flake, spherical, or fibrous type. Non-limiting examples of the amorphous carbon may include soft carbon (low-temperature calcined carbon), hard carbon, mesophase pitch carbonized product, and calcined coke.

Non-limiting examples of the conductive material may include graphite particulates and natural or artificial graphite; carbon black, acetylene black, Ketjenblack®; carbon fibers; carbon nanotubes; metal powders, fibers or tubes of copper, nickel, aluminum, and silver; and conductive polymers such as polyphenylene derivatives. However, the conductive agent is not limited to the above examples and may be any conductive agent available in the art.

The binder may include an aqueous binder or a non-aqueous binder. The amount of the binder may range from about 0.1 parts by weight to about 5 parts by weight based on the total weight (100 parts by weight) of the negative active material composition. When the amount of the binder is within the above range, adhesion between the negative electrode and a current collector is high (e.g., may be improved relative to when the binder is outside of the range).

The aqueous binder may include styrene-butadiene rubber (SBR), polyvinyl alcohols, carboxymethylcellulose, hydroxypropylcellulose, diacetyl cellulose, poly(isobutylene-co-maleic acid) anhydride lithium salt, or a mixture thereof. The SBR binder may be dispersed in water in an emulsion form such that it does not require an organic solvent, and may have high adhesive strength. Accordingly, a high-capacity lithium secondary battery may be manufactured using the binder in a decreased amount and the negative active material in an increased amount. The aqueous binder may be used together with an aqueous solvent such as water or an alcoholic solvent miscible with water. When an aqueous binder is used, a thickening agent may be further used for adjustment of viscosity. The thickening agent may include at least one selected from carboxymethylcellulose, hydroxymethylcellulose, hydroxyethylcellulose, and hydroxypropylcellulose. An amount of the thickening agent may range from about 0.8 wt % to about 5 wt %, for example, about 1 wt % to about 5 wt %, for example, about 1 wt % to about 2 wt %, based on the total weight of the negative active material composition.

When the amount of the thickening agent is within the ranges described above, a current collector may be easily coated with a negative active material layer-forming composition without a decrease in the capacity of a lithium secondary battery.

The non-aqueous binder may be selected from polyvinyl chloride, polyvinyl pyrrolidone, polytetrafluoroethylene, polyvinylidene fluoride, polyethylene, polypropylene, and mixtures thereof. The non-aqueous binder may be used together with at least one non-aqueous solvent selected from N-methyl-2-pyrrolidone (NMP), dimethylformamide, tetrahydrofuran, and mixtures thereof.

In some embodiments, the negative electrode slurry composition may further include a plasticizer to form pores in an electrode plate.

The amounts of the negative active material, the conductive material, the binder, and the solvent may be the substantially the same as or similar to those available for use in lithium secondary batteries in the art.

The negative current collector may be fabricated to have a thickness of about 3 μm to about 500 μm. The negative current collector (e.g., the composition) is not particularly limited as long as it does not cause a chemical change in the fabricated battery and is conductive. Non-limiting examples of the negative current collector may include copper; stainless steel; aluminum; nickel; titanium; sintered carbon; copper or stainless steel that is surface-treated with carbon, nickel, titanium, and/or silver; and aluminum-cadmium alloys. In addition, the negative current collector may be processed to have fine surface irregularities (e.g., surface structures) so as to enhance adhesion of the negative current collector to the negative active material, and may be used in any suitable form, such as films, sheets, foils, nets, porous structures, foams, and non-woven fabrics.

Meanwhile, the positive electrode may be manufactured as follows. The positive electrode may be manufactured using the substantially the same method as that used to manufacture the negative electrode, except that a positive active material is used instead of the negative active material. In addition, a conductive material, a binder, and a solvent, each of which are substantially the same as those used to manufacture the negative electrode, may be used to prepare a positive electrode slurry composition.

For example, the positive electrode slurry composition may be prepared by mixing a positive active material, a conductive material, a binder, and a solvent. The positive electrode slurry composition may be directly coated onto a positive current collector and the resulting positive current collector may be dried to thereby complete the manufacture of a positive electrode including a positive active material layer. In another embodiment, the positive electrode slurry composition may be cast onto a separate support and a film separated from the support may be laminated on a positive current collector to thereby complete the manufacture of a positive electrode including a positive active material layer.

As the positive active material, any lithium-containing metal oxide available in the art may be used without limitation. For example, the positive active material may be at least one selected from composite oxides of lithium and a metal selected from cobalt, manganese, nickel, and combinations thereof. For example, the positive active material may be a compound represented by any one of the following formulae: $Li_aA_{1-b}B'_bD'_2$ where $0.90 \leq a \leq 1$ and $0 \leq b \leq 0.5$; $Li_aE_{1-b}B'_bO_{2-c}D'_c$ where $0.90 \leq a \leq 1$, $0 \leq b \leq 0.5$, and $0 \leq c \leq 0.05$; $LiE_{2-b}B'_bO_{4-c}D'_0$ where $0 \leq b \leq 0.5$ and $0 \leq c \leq 0.05$; $Li_aNi_{1-b-c}Co_bB'D'_\alpha$ where $0.90 \leq a \leq 1$, $0 \leq b \leq 0.5$, $0 \leq c \leq 0.05$, and $0 < \alpha \leq 2$; $Li_aNi_{1-b-c}Co_bB'_cO_{2-\alpha}F'_\alpha$ where $0.90 \leq a \leq 1$, $0 \leq b \leq 0.5$, $0 \leq c \leq 0.05$, and $0 < \alpha < 2$; $Li_aNi_{1-b-c}Co_bB'_cO_{2-\alpha}F'_2$ where $0.90 \leq a \leq 1$, $0 \leq b \leq 0.5$, $0 \leq c \leq 0.05$, and $0 < \alpha < 2$; $Li_aNi_{1-b-c}Mn_bB'_cD'_\alpha$ where $0.90 \leq a \leq 1$, $0 \leq b \leq 0.5$, $0 \leq c \leq 0.05$, and $0 < \alpha \leq 2$; $Li_aNi_{1-b-c}Mn_bB'_cO_{2-\alpha}F'_\alpha$ where $0.90 \leq a \leq 1$, $0 \leq b \leq 0.5$, $0 \leq c \leq 0.05$, and $0 < \alpha < 2$; $Li_aNi_{1-b-c}Mn_bB'_cO_{2-\alpha}F'_2$ where $0.90 \leq a \leq 1$, $0 \leq b \leq 0.5$, $0 \leq c \leq 0.05$, and $0 < \alpha < 2$; $Li_aNi_bE_cG_dO_2$ where $0.90 \leq a \leq 1$, $0 \leq b \leq 0.9$, $0 \leq c \leq 0.5$, and $0.001 \leq d \leq 0.1$; $Li_aNi_bCo_cMn_dG_{(e)}O_2$ where $0.90 \leq a \leq 1$, $0 \leq b \leq 0.9$, $0 \leq c \leq 0.5$, $0 \leq d \leq 0.5$, and $0.001 \leq (e) \leq 0.1$; $Li_aNiG_bO_2$ where $0.90 \leq a \leq 1$ and $0.001 \leq b \leq 0.1$; $Li_aCoG_bO_2$ where $0.90 \leq a \leq 1$ and $0.001 \leq b \leq 0.1$; $Li_aMnG_bO_2$ where $0.90 \leq a \leq 1$ and $0.001 \leq b \leq 0.1$; $Li_aMn_2G_bO_4$ where $0.90 \leq a \leq 1$ and $0.001 \leq b \leq 0.1$; $QO_2$; $QS_2$; $LiQS_2$; $V_2O_5$; $LiV_2O_5$; $LiI'O_2$; $LiNiVO_4$; $Li_{(3-f)}J_2(PO_4)_3$ where $0 \leq f \leq 2$; $Li_{(3-f)}Fe_2(PO_4)_3$ where $0 \leq f \leq 2$; and $LiFePO_4$.

In the formulae above, A is nickel (Ni), cobalt (Co), manganese (Mn), or a combination thereof; B' is aluminum (Al), Ni, Co, Mn, chromium (Cr), iron (Fe), magnesium (Mg), strontium (Sr), vanadium (V), a rare earth element, or a combination thereof; D' is oxygen (O), fluorine (F), sulfur (S), phosphorus (P), or a combination thereof; E is Co, Mn, or a combination thereof; F' is F, S, P, or a combination thereof; G is Al, Cr, Mn, Fe, Mg, lanthanum (La), cerium (Ce), strontium (Sr), V, or a combination thereof; Q is titanium (Ti), molybdenum (Mo), Mn, or a combination thereof; I' is Cr, V, Fe, scandium (Sc), yttrium (Y), or a combination thereof; and J is V, Cr, Mn, Co, Ni, copper (Cu), or a combination thereof.

The compounds described above having a coating layer on their surfaces may be used (e.g., alone), or the compounds described above and the compounds described above having a coating layer on their surfaces may be used in combination. The coating layer may include a coating element compound, such as an oxide of a coating element, a hydroxide of a coating element, an oxyhydroxide of a coating element, an oxycarbonate of a coating element, or a hydroxycarbonate of a coating element. The coating element compounds may be amorphous or crystalline. The coating element included in the coating layer may be Mg, Al, Co, K, Na, Ca, Si, Ti, V, Sn, Ge, Ga, B, As, Zr, or a mixture thereof.

A coating layer may be formed using the coating elements in the aforementioned compounds by using any suitable coating method (e.g., spray coating or immersion) that does not adversely affect the physical properties of the positive active material. Such methods are understood by those of ordinary skill in the art, and detailed descriptions thereof will not be provided herein.

The amounts of the positive active material, the conductive material, the binder, and the solvent may be substantially the same as those used in lithium secondary batteries in the art. At least one of the conductive material, the binder, and the solvent may not be used (e.g., may be omitted) depending on the intended use and design of the lithium secondary battery.

The positive current collector may be fabricated to a thickness of about 3 µm to about 500 µm. The positive current collector is not particularly limited so long as it does not cause a chemical change in the fabricated battery and is conductive. Non-limiting examples of the positive current collector may include copper; stainless steel; aluminum; nickel; titanium; sintered carbon; copper or stainless steel that is surface-treated with carbon, nickel, titanium, or silver; and aluminum-cadmium alloys. In addition, the positive current collector may be processed to have fine surface irregularities (e.g., surface structures) so as to enhance the adhesion of the positive current collector to the positive active material, and may be used in various suitable forms including films, sheets, foils, nets, porous structures, foams, and non-woven fabrics.

The positive electrode may have a mixed density of at least 2.0 g/cc.

The positive electrode and the negative electrode may be separated from each other by a separator, and any separator available in the art for lithium secondary batteries may be used. In particular, a separator having low resistance to ion transfer in an electrolyte and having an excellent electrolyte-retaining ability may be used. For example, the separator may be made of one selected from glass fiber, polyester, Teflon, polyethylene, polypropylene, polytetrafluoroethylene (PTFE), and combinations thereof, each of which may be a non-woven or woven fabric. The separator may have a pore diameter of about 0.01 µm to about 10 µm and may have a thickness of about 5 µm to about 300 µm.

A lithium salt-containing non-aqueous electrolyte includes a non-aqueous electrolyte and a lithium salt. The non-aqueous electrolyte may be a non-aqueous electrolytic solution, an organic solid electrolyte, an inorganic solid electrolyte, and/or the like.

The non-aqueous electrolyte solution may be, for example, an aprotic organic solvent such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and/or the like.

Non-limiting examples of the organic solid electrolyte may include polyethylene derivatives, polyethylene oxide derivatives, polypropylene oxide derivatives, phosphoric acid ester polymers, poly agitation lysine (e.g., poly-L-arginine or poly-L-lysine), polyester sulfide, polyvinyl alcohols, polyvinylidene fluoride, and polymers containing ionic dissociation groups.

Non-limiting examples of the inorganic solid electrolyte may include nitrides, halides and sulfates of lithium, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt may be any lithium salt available in the art for lithium secondary batteries that is readily soluble in the non-aqueous electrolyte. The lithium salt may be, for example, at least one selected from LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carboxylic acid lithium, lithium tetraphenyl borate, and lithium imide.

Lithium secondary batteries may be classified as lithium-ion secondary batteries, lithium-ion polymer secondary batteries, and lithium polymer secondary batteries according to the types of separator and electrolyte included therein. In addition, lithium secondary batteries may be classified as cylindrical, rectangular, coin-type, and pouch-type batteries according to their shape, and as bulk-type and thin-film-type according to their size or form factor.

Methods of manufacturing these batteries are well known in the art, and thus, a detailed description thereof is not provided herein.

FIG. 1 is a schematic view illustrating a structure of a lithium secondary battery 200 according to an embodiment of the present disclosure.

As illustrated in FIG. 1, the lithium secondary battery 200 includes a positive electrode 214, a separator 213 and 215, and a negative electrode 212. The positive electrode 214, the separator 213 and 215, and the negative electrode 212 are wound or folded, and then accommodated in a battery case 220. Subsequently, an organic electrolytic solution is injected into the battery case 220 and the battery case 220 is sealed by a sealing member 240 to thereby complete the manufacture of the lithium secondary battery 200. The battery case 220 may have a cylindrical, rectangular, or thin-film form, and/or the like. For example, the lithium secondary battery 200 may be a large-scale thin-film-type battery. The lithium secondary battery may be, for example, a lithium-ion secondary battery.

A separator may be between the positive electrode and the negative electrode to form a battery assembly. A plurality of battery assemblies may be stacked in a bi-cell structure and impregnated with an organic electrolytic solution, and the resultant structure may be put into a pouch and hermetically sealed to thereby complete the manufacture of a lithium-ion polymer secondary battery.

In addition, the battery assemblies may be stacked to form a battery pack, and such a battery pack may be used in any device requiring high capacity and high power output. For example, the battery pack may be used in notebook computers, smartphones, motor-driven tools, electric vehicles, and/or the like.

In addition, the lithium secondary battery may be used in electric vehicles (EVs). For example, the lithium secondary battery may be used in hybrid vehicles such as plug-in hybrid electric vehicles (PHEVs) and/or the like.

The negative active material for a lithium secondary battery, according to an embodiment of the present disclosure, may be prepared using the following method.

First, a mother alloy including Si, Fe, Cu, and Al, or a mother alloy including Si, Fe, and Cu, may be prepared.

A process of preparing the mother alloy may include vacuum induction melting (VIM), arc melting, and/or mechanical alloying, and may be, for example, VIM whereby the mother alloy is dissolved in a vacuum atmosphere to suppress atmospheric oxidation to a maximum extent. However, the method of preparing the mother alloy is not limited to the above examples, and all methods of preparing mother alloys that are available in the art may be used.

Next, the mother alloy may be cooled to form a Si single phase and the above-described alloy phases to prepare an alloy ribbon.

In the preparation of the alloy ribbon, the process of cooling the mother alloy may include rapidly cooling the mother alloy at a rate of 1,000° C./s or more, for example, at a rate of about 1,000° C./s to about 2,000° C./s. When the mother alloy is rapidly cooled at a cooling rate within the above ranges, phases included in the alloy ribbon or alloy powder may be suitably and uniformly distributed.

Non-limiting examples of the rapid cooling process may include a melt spinner method and gas atomization. For example, a melt spinner method may be used.

As an example, a melt spinner will be described as follows.

The melt spinner includes a cooling roll, a high-frequency induction coil, and a tube. The cooling roll may be formed of a metal having high thermal conductivity and high thermal impact resistance, for example, copper or a copper alloy. The cooling roll may rotate by a rotating member such as a motor at a high speed, for example, in a range of about 500 revolutions per minute (rpm) to about 5000 rpm. In the high-frequency induction coil, high-frequency electric current flows due to a high-frequency induction member, thereby inducing high frequency to a material inserted into the tube. For cooling purposes, a cooling medium flows through the high-frequency induction coil. The tube may be formed using a material having low reactivity with the inserted material and high thermal resistance, such as quartz, refractory glass, and/or the like. In the tube, high frequency is induced by the high-frequency induction coil, and materials (e.g., silicon and a metal material) to be melted are inserted. The high-frequency induction coil is rolled around the tube and melts the material inserted into the tube at a temperature ranging from about 850° C. to about 1600° C. by high-frequency induction, thereby forming a melt in a liquid phase or a phase having fluidity. In this case, the tube may be in a vacuum or inert atmosphere to prevent unwanted oxidation of the melt. When the melt is formed, a compressed gas having a pressure of about 10 Torr to about 200 Torr (e.g., an inert gas, such as argon or nitrogen) is supplied into the tube from one side of the tube, and the melt is discharged through a nozzle formed on the other side of the tube by the compressed gas. The melt discharged from the tube contacts the rotating cooling roll and is rapidly cooled by the cooling roll to form a rapidly-cooled condensed solid. The rapidly-cooled condensed solid may have a ribbon, flake, or powder form, and/or the like. The melt may be cooled by rapid solidification by the cooling roll at a rapid cooling rate, for example, a cooling rate of about 1000° C./s or more. For example, the melt may be cooled at a cooling rate of about 1000° C./s to about 2000° C./s. In this regard, the cooling rate may vary according to a rotation rate, material, temperature, etc. of the cooling roll.

Subsequently, the alloy ribbon may be pulverized to prepare alloy powder.

The pulverizing process may be performed using any suitable method available in the art. For example, the pulverizing method may be an atomizer method, vacuum milling, ball milling, planetary ball milling, bead milling, jet milling, and/or the like.

The alloy ribbon may be pulverized by mechanical milling. The mechanical milling may be, for example, ball milling.

The alloy powder may have a mean particle diameter D50 of about 0.1 μm to about 10 μm, for example, about 0.2 μm to about 10 μm, for example, about 0.3 μm to about 10 μm. Assuming that a total number of particles is 100%, the term "median particle diameter D50" as used herein means the particle size value at which 50% of particles are smaller on a cumulative distribution curve represented in the order of the smallest particles to the largest particles. The D50 value may be measured using any suitable method available in the art, for example, using a particle size analyzer, or from a transmission electron microscopy (TEM) image or a scanning electron microscopy (SEM) image. In another embodiment, the D50 value may be calculated from measurements using dynamic light scattering and data analysis on the measured values to count the number of particles in each particle size range.

Particles of the alloy powder having a mean particle diameter D50 within the above-described ranges may not agglomerate with each other, or agglomeration may be decreased, and thus cycle characteristics may be enhanced.

The present disclosure will now be described in further detail with reference to the following examples and comparative examples. These examples are provided only for illustrative purposes and are not intended to limit the scope of the disclosure.

EXAMPLES

Example 1: Preparation of Negative Active Material for Lithium Secondary Battery Si, Fe, Cu, and Al were mixed in a ratio of 76:16:6:2 on an atomic percent basis. The mixture was melted in a vacuum atmosphere using an induction melting furnace to prepare a mother alloy of Si, Fe, Cu, and Al.

The mother alloy was put into an injection tube of a melt spinner (manufactured by Yein Tech) and melted at a temperature of about 1500° C. for about 5 minutes by high-frequency induction under an argon gas atmosphere at a pressure of about 100 Torr. The melt of the mother alloy was injection-cooled at a cooling rate of about 1500° C./s by a wheel rotating at a speed of about 2500 rpm to prepare an alloy ribbon. The alloy ribbon was then pulverized by a ball mill to thereby complete preparation of an alloy powder as a negative active material for a lithium secondary battery, the alloy powder consisting of 76 atom % Si, 16 atom % Fe, 6 atom % Cu, and 2 atom % Al and having a mean particle diameter of about 7 μm.

The negative active material for a lithium secondary battery included a Si single phase, a first alloy phase represented by a formula of $Al_4Cu_9$, and a second alloy phase represented by a formula of $Cu_{15}Si_4$ and a formula of $\alpha$-$Fe_2Si_5$.

Example 2: Preparation of Negative Active Material for Lithium Secondary Battery An alloy powder including 79 atom % Si, 17 atom % Fe, and 4 atom % Cu and having a mean particle diameter of about 7 μm was prepared as a negative active material for a lithium secondary battery by mixing Si, Fe, and Cu in an atomic percent ratio of 79:17:4 instead of mixing Si, Fe, Cu, and Al in an atomic percent ratio of 76:16:6:2.

The negative active material for a lithium secondary battery included a Si single phase, a first alloy phase represented by a formula of $Cu_{15}Si_4$, a second alloy phase represented by a formula of $Cu_3Fe_{17}$, and a third alloy phase represented by a formula of $\alpha\text{-}Fe_2Si_5$ and a formula of FeSi.

Example 3: Preparation of Negative Active Material for Lithium Secondary Battery An alloy powder including 78 atom % Si, 16 atom % Fe, and 6 atom % Cu and having a mean particle diameter of about 7 μm was prepared as a negative active material for a lithium secondary battery by mixing Si, Fe, and Cu in an atomic percent ratio of 78:16:6 instead of mixing Si, Fe, Cu, and Al in an atomic percent ratio of 76:16:6:2.

The negative active material for a lithium secondary battery included a Si single phase, a first alloy phase represented by a formula of $Cu_{15}Si_4$, a second alloy phase represented by a formula of $Cu_3Fe_{17}$, and a third alloy phase represented by a formula of $\alpha\text{-}Fe_2Si_5$ and a formula of FeSi.

Comparative Example 1: Preparation of Negative Active Material for Lithium Secondary Battery An alloy powder including 83 atom % Si and 17 atom % Fe and having a mean particle diameter of about 7 μm was prepared as a negative active material for a lithium secondary battery by mixing Si and Fe in an atomic percent ratio of 83:17 instead of mixing Si, Fe, Cu, and Al in an atomic percent ratio of 76:16:6:2.

The negative active material for a lithium secondary battery included a Si single phase and an alloy phase represented by a formula of $\alpha\text{-}Fe_2Si_5$.

Example 4: Manufacture of Lithium Secondary Battery (Coin Half-Cell)

Poly(isobutylene-co-maleic acid) anhydride lithium salt (weight average molecular weight: 2,000,000 to 2,500,000) as an aqueous binder and Ketjenblack® were mixed using a planetary centrifugal mixer (Thinky Mixer) for 2 minutes in amounts of 8 parts by weight and 1 part by weight, respectively, based on 100 parts by weight of a negative electrode slurry. The negative active material prepared according to Example 1, artificial graphite (manufactured by MITSUBISHI), and graphite plate (TIMCAL TIMREX®) were mixed in a weight ratio of 7:3, distilled water was added thereto, and the resulting solution was mixed for 2 minutes. Solids were controlled by repeating these processes, and the resulting mixture was further stirred for 10 minutes to prepare a negative active material electrode slurry.

Using a doctor blade, the negative electrode slurry was coated onto a Cu current collector to a thickness of 10 μm, in a coating amount of 5.5 mg/cm², and at a mixed density of 1.5 g/cc, followed by drying in a vacuum atmosphere at 110° C. for 20 minutes, thereby completing the manufacture of a negative electrode.

The negative electrode, Li metal as a counter electrode, a microporous polypropylene separator (Star 20, Asahi, Japan), and an electrolytic solution prepared by dissolving 1.0 M $LiPF_6$ in a mixed solvent of ethylene carbonate (EC), diethylene carbonate (DEC), and fluoroethylene carbonate (FEC) in a volume ratio of 5:70:25, were used to manufacture a lithium secondary battery (coin half-cell) in a helium-filled glove box.

Examples 5 and 6: Manufacture of Lithium Secondary Battery (Coin Half-Cell)

Lithium secondary batteries (coin half-cells) were manufactured in the same manner as in Example 4, except that the negative active materials prepared according to Examples 2 and 3 were respectively used instead of the negative active material of Example 1.

Comparative Example 2: Manufacture of Lithium Secondary Battery (Coin Half-Cell)

A lithium secondary battery (coin half-cell) was manufactured in the same manner as in Example 4, except that the negative active material prepared according to Comparative Example 1 was used instead of the negative active material of Example 1.

Analysis Example 1: X-Ray Diffraction (XRD) Analysis

XRD analysis (X'pert PRO MPD, manufactured by PANalytical) was performed on each of the negative active materials of Examples 1 to 3 and Comparative Example 1, and the experimental results are illustrated in FIGS. 2A to 2D. The XRD analysis was performed using CuK-α radiation at 1.541 Å.

Figure 2A:
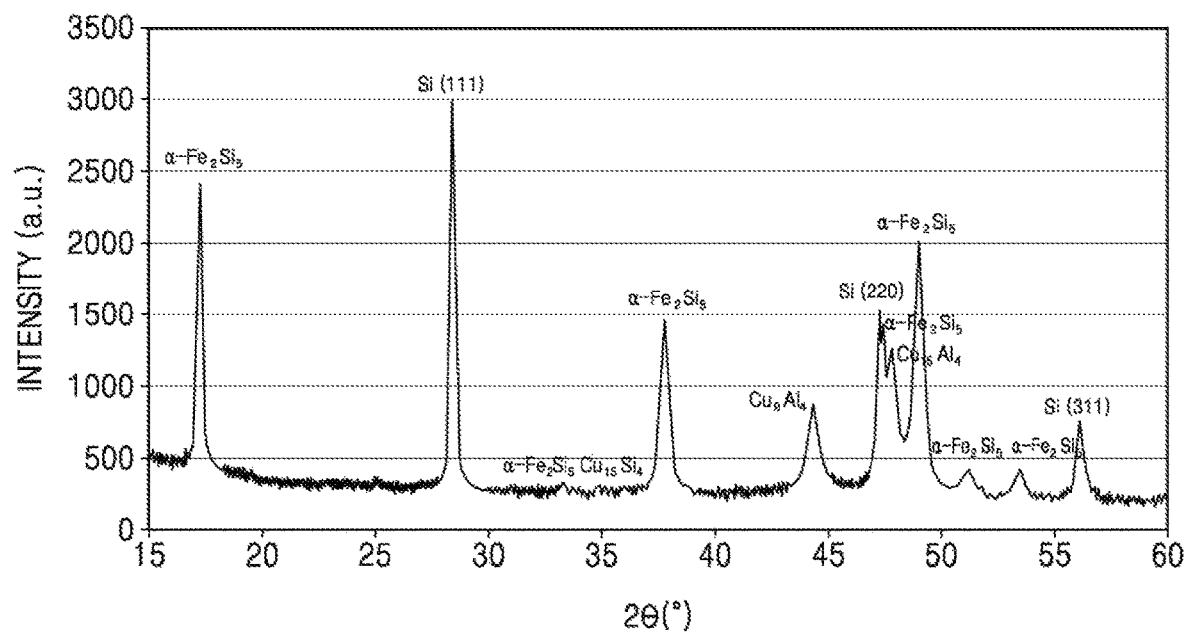
FIGS. 2A to 2D are graphs respectively showing X-ray diffraction (XRD) analysis results of negative active materials for a lithium secondary battery prepared according to Examples 1 to 3 and Comparative Example 1.

Referring to FIG. 2A, peaks of a Si single phase, a first alloy phase represented by a formula of $Cu_9Al_4$, and second alloy phases represented by a formula of $Cu_{15}Si_4$ and a formula of $\alpha\text{-}Fe_2Si_5$ were observed in the negative active material of Example 1. As the Si single phase, peaks of a Si (111) plane, a Si (220) plane, and a Si (311) plane were observed at Bragg (2θ) angles of 28.4°, 47.3°, and 56.1°, respectively. Main peaks of the second alloy phases represented by a formula of $Cu_{15}Si_4$ and a formula of $\alpha\text{-}Fe_2Si_5$ were observed in the vicinity of the peak of the Si (220) plane. The peak of the first alloy phase of $Cu_9Al_4$ appeared at a Bragg (2θ) angle of 44.3°.

Figure 2B:
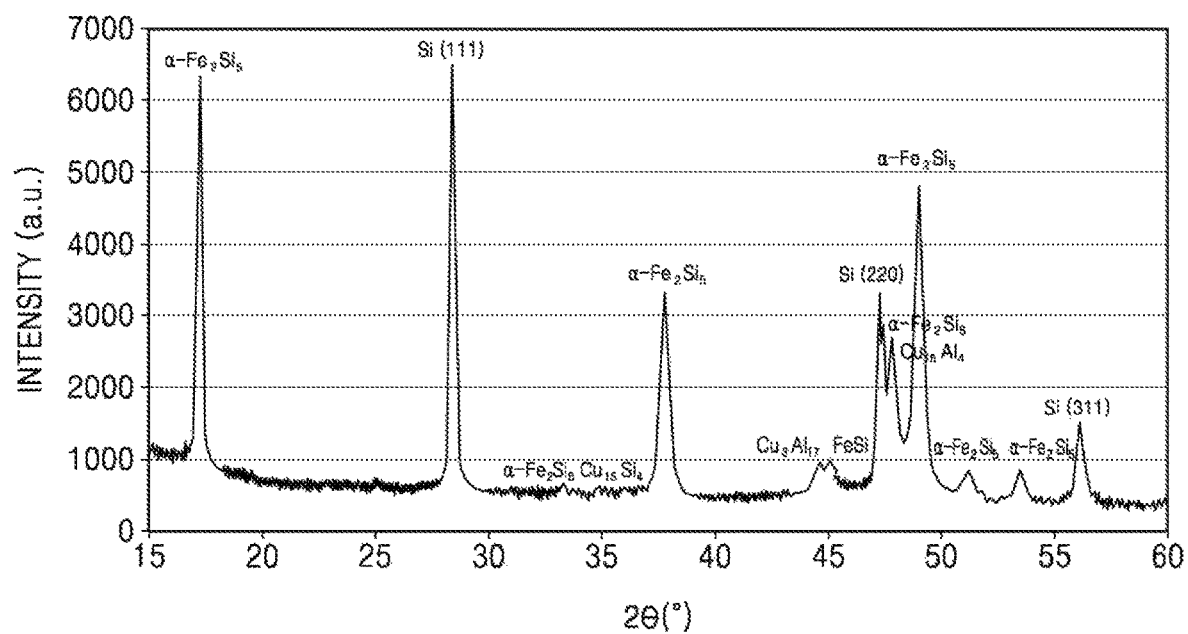
Figure 2C:
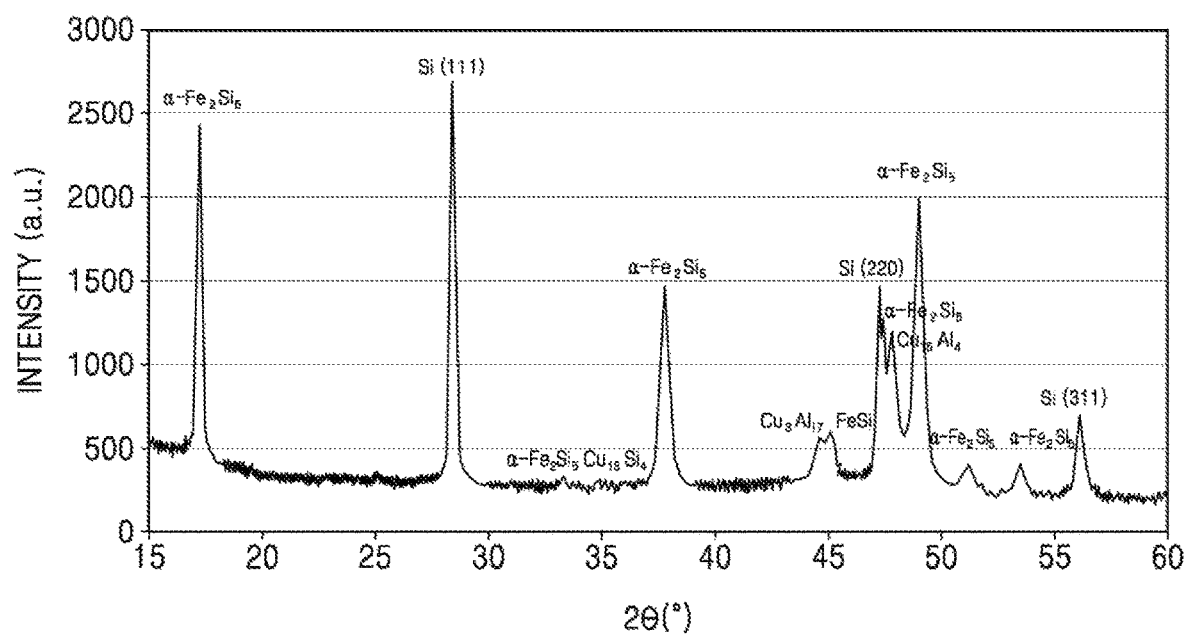

Referring to FIGS. 2B and 2C, peaks (Si single phase and alloy phases of $Cu_{15}Si_4$ and $\alpha\text{-}Fe_2Si_5$) of the same phases as those shown in the XRD analysis of the negative active material of Example 1 were observed in the negative active material of Example 2, except that the negative active material of Example 2 had a peak of a third alloy phase represented by a formula of FeSi which appeared at a Bragg (2θ) angle of 45.1 and did not have the peak of the first alloy phase of $Al_4Cu_9$.

Figure 2D:
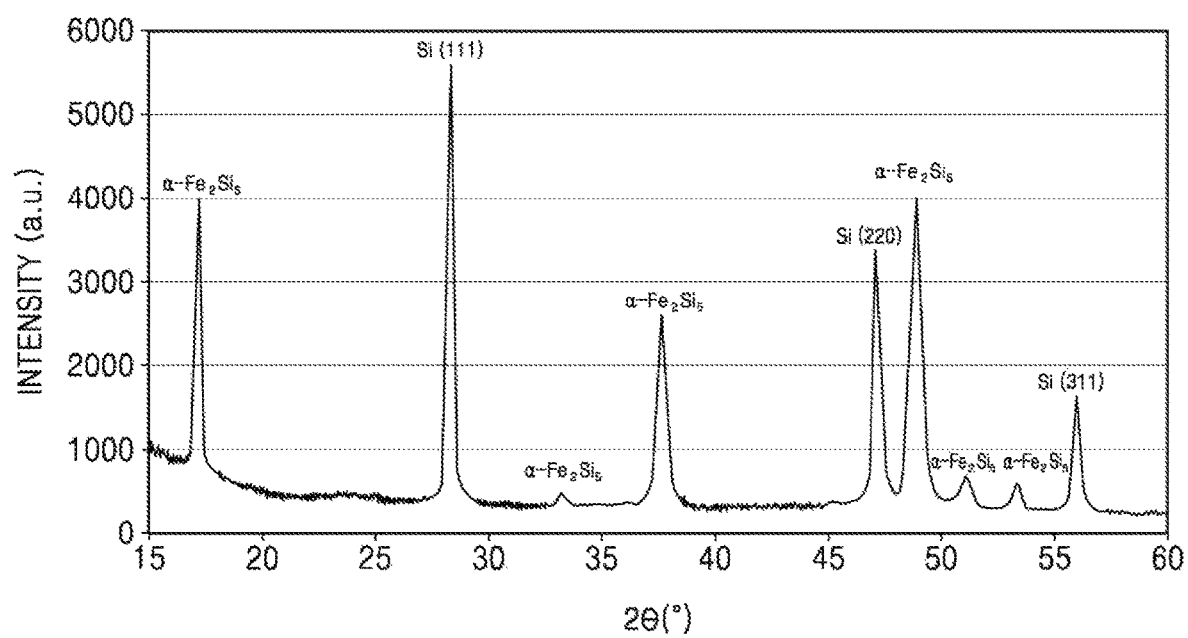

Referring to FIG. 2D, only peaks of the Si single phase and the alloy phase of $\alpha\text{-}Fe_2Si_5$ were observed in the negative active material of Comparative Example 1.

Meanwhile, a FWHM value of the peak of the Si(220) plane among the Si single phases of each of the negative active materials of Examples 1 to 3 and Comparative Example 1 was obtained, an average particle size of each negative active material was calculated using the Scherrer equation represented by Equation 1 below, and the results are shown in Table 1 below.

$$t = K\lambda/\beta \cos\theta \qquad \text{Equation 1}$$

In Equation 1, K denotes a shape factor of 0.9, λ denotes an X-ray wavelength of 1.5406 Å, β denotes a half-width, and θ denotes a Bragg (2θ) angle of 47.30.

TABLE 1

| | Half-width (°) | Average particle size (nm) |
|---|---|---|
| Example 1 | 0.0031 | 48.42 |
| Example 2 | 0.0027 | 56.48 |
| Example 3 | 0.0027 | 56.5 |
| Comparative Example 1 | 0.0018 | 84.76 |

As shown in Table 1, the average particle size of the Si active particles of each of the negative active materials of Examples 1 to 3 was smaller than that of the Si active particles of the negative active material of Comparative Example 1.

Evaluation Example 1: Electrical Conductivity Evaluation

Figure 3:
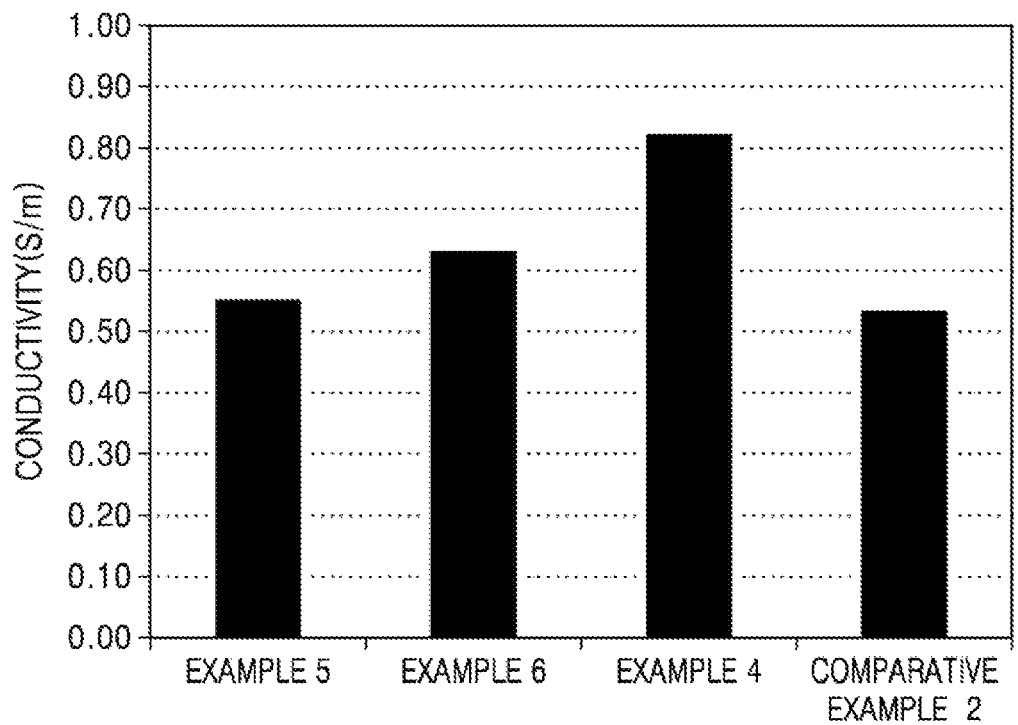
FIG. 3 is a graph showing electrical conductivity evaluation results of negative electrodes of lithium secondary batteries manufactured according to Examples 4 to 6 and Comparative Example 2.

The electrical conductivities of a negative electrode of each of the lithium secondary batteries manufactured according to Examples 4 to 6 and Comparative Example 2 was measured, and the results thereof are shown in Table 2 and FIG. 3. The electrical conductivity was measured at room temperature using electrical conductivity measurement equipment available from CIS, Co., Ltd.

TABLE 2

| | Electrical conductivity (S/m) |
|---|---|
| Example 4 | 0.82 |
| Example 5 | 0.56 |
| Example 6 | 0.63 |
| Comparative Example 2 | 0.53 |

As shown in Table 2 and FIG. 3, the negative electrode of each of the lithium secondary batteries of Examples 4 to 6 exhibited enhanced electrical conductivity compared to that of the negative electrode of the lithium secondary battery of Comparative Example 2.

Evaluation Example 2: Adhesion Evaluation

Figure 4:
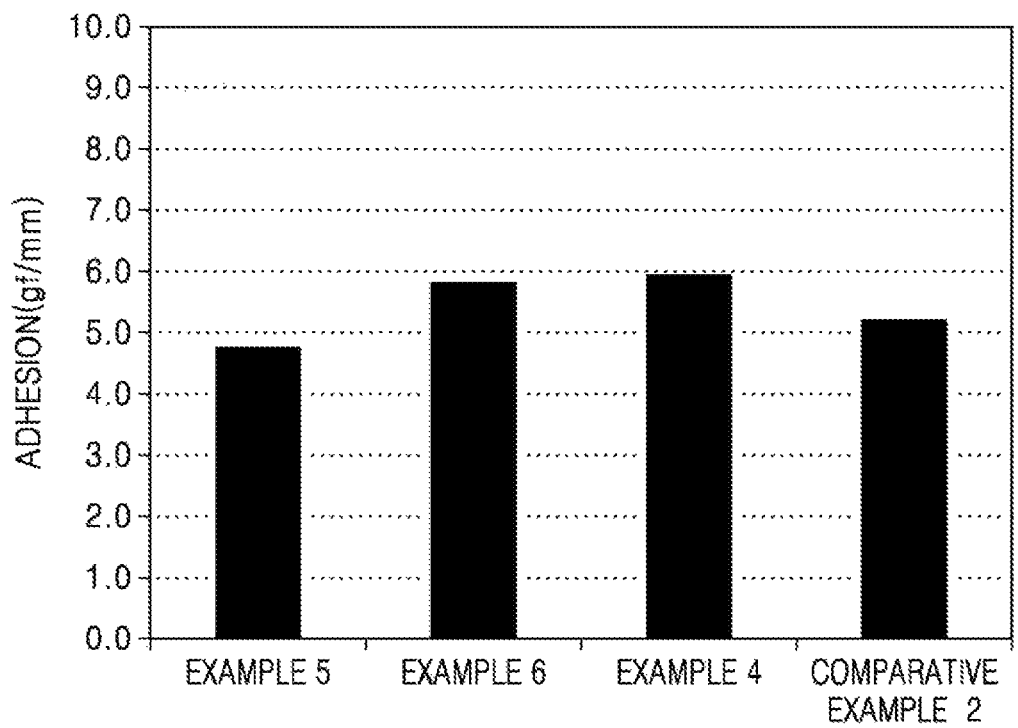
FIG. 4 is a graph showing evaluation results of adhesion between a negative active material and a negative electrode plate of each of the lithium secondary batteries of Examples 4 to 6 and Comparative Example 2.

Adhesion between the negative active material and a negative electrode plate of each of the lithium secondary batteries of Examples 4 to 6 and Comparative Example 2 was measured, and the results thereof are shown in Table 3 and FIG. 4. The adhesion between the negative electrode plate and the negative active material of each lithium secondary battery was evaluated such that a 3M tape having a certain length and width was attached to a surface of each negative active material, and then the force (gf/mm) required to peel the negative active material off the negative electrode plate was measured by a 180° peel-off test using a tensile strength tester available from INSTRON. The results thereof are shown in Table 3 and FIG. 4.

TABLE 3

| | Adhesion (gf/mm) |
|---|---|
| Example 4 | 5.95 |
| Example 5 | 4.85 |
| Example 6 | 5.9 |
| Comparative Example 2 | 5.2 |

As shown in Table 3 and FIG. 4, the adhesion between the negative electrode plate and the negative active material of each of the lithium secondary batteries of Examples 4 and 6 was higher than that between the negative electrode plate and the negative active material of the lithium secondary battery of Comparative Example 2.

Evaluation Example 3: Evaluation of Charge and Discharge Characteristics

Charge and discharge characteristics of each of the lithium secondary batteries of Examples 4 to 6 and Comparative Example 2 were evaluated using a charger/discharger (manufactured by HNT, 100 mAh class).

3-1. Initial Efficiency Evaluation

In a $1^{st}$ cycle of charging and discharging at room temperature, each of the lithium secondary batteries of Examples 4 to 6 and Comparative Example 2 was charged at a constant current of 0.1 C until the voltage reached 10 mV, and then charged at a constant voltage of 10 mV until the current reached 0.01 C. The completely charged cells were rested for a period of about 20 minutes, and then each lithium secondary battery was discharged at a constant current of 0.2 C until the voltage reached 1.5 V. In a $2^{nd}$ cycle of charging and discharging, each lithium secondary battery was charged at a constant current of 0.2 C until the voltage reached 10 mV, and then charged at a constant voltage of 10 mV until the current reached 0.01 C. The completely charged cells were rested for a period of about 20 minutes, and then each lithium secondary battery was discharged at a constant current of 0.2 C until the voltage reached 1.5 V. During these processes, discharge capacity and charge capacity of each lithium secondary battery were measured and initial efficiency thereof (a value obtained by dividing the $1^{st}$ cycle discharge capacity by the $1^{st}$ cycle charge capacity and multiplying the obtained value by 100) was calculated. The results thereof are shown in Table 4 below and FIG. 5.

TABLE 4

| | Initial efficiency (%) |
|---|---|
| Example 4 | 85.75 |
| Example 5 | 84.7 |
| Example 6 | 84.55 |
| Comparative Example 2 | 84.0 |

Figure 5:
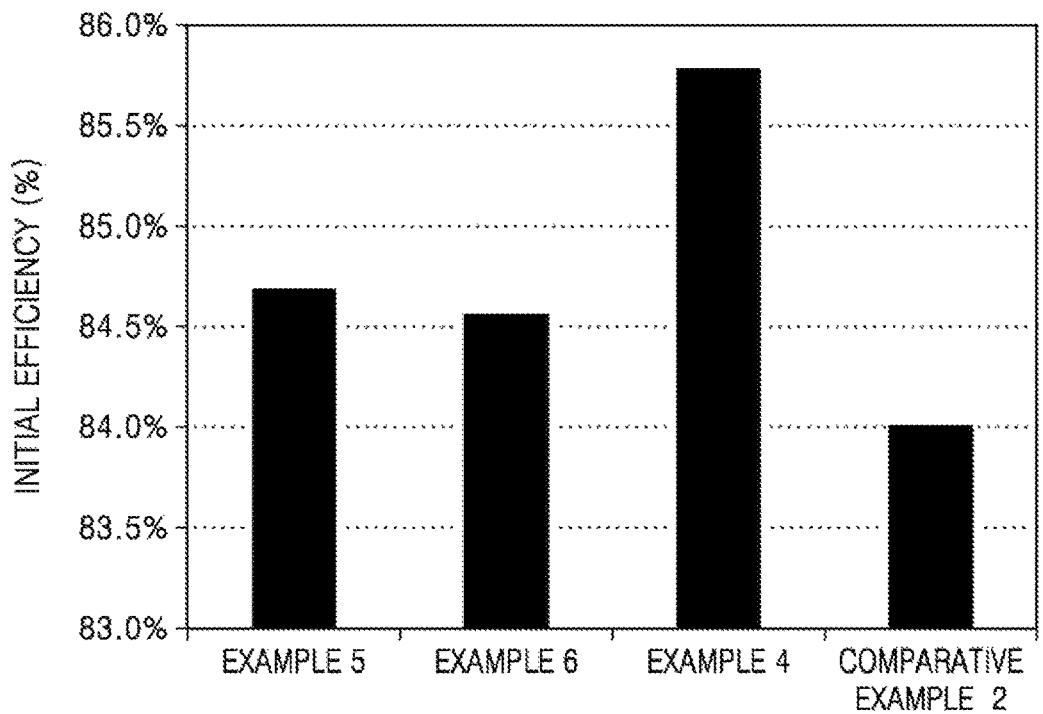
FIG. 5 is a graph showing evaluation results of initial efficiencies of the lithium secondary batteries of Examples 4 to 6 and Comparative Example 2.

As shown in Table 4 and FIG. 5, the initial efficiency of each of the lithium secondary batteries of Examples 4 to 6 was higher than that of the lithium secondary battery of Comparative Example 2.

3-2. Evaluation of Volume Capacity (Capacity Per Volume)

The volume capacity (capacity per volume) of each of the lithium secondary batteries of Example 4 and Comparative Example 2 was calculated by multiplying the $2^{nd}$ cycle discharge capacity (capacity per weight) taken during the 3-1 Initial efficiency evaluation above by a ratio of a mixture to an active material (e.g., the ratio of the active material mass to the total mixture volume). The results thereof are shown in Table 5 below.

TABLE 5

| | Volume capacity (capacity per volume) (mAh/cc) |
|---|---|
| Example 4 | 890 |
| Comparative Example 2 | 887 |

As shown in Table 5, the volume capacity (capacity per volume) of the negative active material of the lithium secondary battery of Example 4 was higher than that of the negative active material of the lithium secondary battery of Comparative Example 2.

3-3. Evaluation of Lifespan Characteristics

Lifespan characteristics of the lithium secondary batteries of Examples 4 to 6 and Comparative Example 2 were evaluated. The results thereof are shown in Table 6 below and FIG. 6.

An experiment for evaluating the lifespan characteristics was conducted such that each lithium secondary battery was subjected to a $1^{st}$ cycle of charging and discharging at a charge/discharge current density of 0.1 C, a charge cut-off voltage of 10 mV (Li/Li$^+$), and a discharge cut-off voltage of 1.5 V (Li/Li$^+$); a $2^{nd}$ cycle of charging and discharging at a charge/discharge current density of 0.2 C; and then charged and discharged up to a $50^{th}$ cycle at a charge/discharge current density of 1.0 C. Then, capacity changes according to each cycle were measured. Cycle retention values were calculated therefrom. Cycle retention (%) was obtained according to Equation 2 below:

$$\text{Cycle retention (\%)} = [50^{th} \text{ cycle discharge capacity at}/1^{st} \text{ cycle discharge capacity}] \times 100 \quad \text{Equation 2}$$

TABLE 6

|  | Capacity retention (%) |
| --- | --- |
| Example 4 | 62.8 |
| Example 5 | 44.9 |
| Example 6 | 52.8 |
| Comparative Example 2 | 44.0 |

Figure 6:
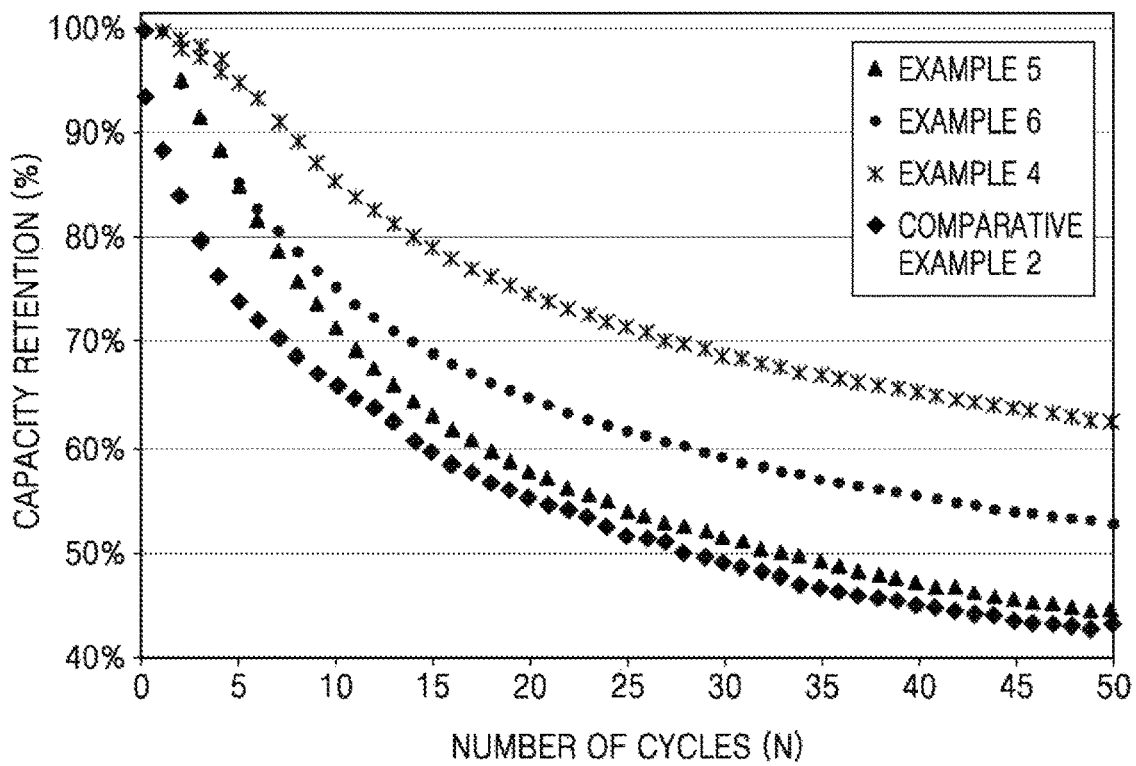
FIG. 6 is a graph showing evaluation results of capacity retentions of the lithium secondary batteries of Examples 4 to 6 and Comparative Example 2.

As shown in Table 6 and FIG. 6, the capacity retention of each of the lithium secondary batteries of Examples 4 to 6 was higher than that of the lithium secondary battery of Comparative Example 2.

As is apparent from the foregoing description, electrical conductivity of a negative electrode of a lithium secondary battery including a negative active material for a lithium secondary battery, according to an embodiment, and adhesion between a negative electrode plate and the negative active material may be enhanced. In addition, charge and discharge characteristics such as initial efficiency, capacity (capacity per weight and capacity per volume), and lifespan characteristics may be enhanced.

It should be understood that embodiments described herein should be considered in a descriptive sense only and not for purposes of limitation. Descriptions of features or aspects within each embodiment should typically be considered as being available for other similar features or aspects in other embodiments.

While one or more embodiments have been described with reference to the figures, it will be understood by those of ordinary skill in the art that various changes in form and details may be made therein without departing from the spirit and scope of the present disclosure, as defined by the following claims and equivalents thereof.

What is claimed is:

1. A negative active material for a lithium secondary battery, comprising:
    a silicon (Si)-based alloy negative active material comprising Si, iron (Fe), copper (Cu), and aluminum (Al);
    the Si-based alloy negative active material having a Si single phase and a first alloy phase, the first alloy phase being represented by a formula of $Al_xCu_y$, where x<y.

2. The negative active material of claim 1, wherein $Al_xCu_y$ comprises $Al_4Cu_9$.

3. The negative active material of claim 1, wherein the Si-based alloy negative active material further has a second alloy phase, the second alloy phase being composed of Si and Fe or Si and Cu.

4. The negative active material of claim 3, wherein the second alloy phase comprises at least one alloy phase represented by a formula selected from $Cu_{15}Si_4$ and $Fe_2Si$.

5. The negative active material of claim 1, wherein an amount of the Fe ranges from about 5 atom % to about 20 atom % based on 100 atom % of the Si-based alloy negative active material.

6. The negative active material of claim 1, wherein an amount of the Cu ranges from about 3 atom % to about 15 atom % based on 100 atom % of the Si-based alloy negative active material.

7. The negative active material of claim 1, wherein an amount of the Al ranges from about 2 atom % to about 5 atom % based on 100 atom % of the Si-based alloy negative active material.

8. The negative active material of claim 1, wherein an amount of the Si ranges from about 60 atom % to about 90 atom % based on 100 atom % of the Si-based alloy negative active material.

9. The negative active material of claim 1, wherein the Si-based alloy negative active material has a capacity per volume of about 900 mAh/cc or more.

10. The negative active material of claim 1, wherein the Si single phase comprises Si active particles of an average particle size of about 45 nm to about 60 nm.

11. A lithium secondary battery comprising:
    a negative electrode comprising the negative active material according to claim 1;
    a positive electrode; and
    an electrolyte between the negative electrode and the positive electrode.

\* \* \* \* \*